United States Patent
Sobota et al.

[15] 3,696,853
[45] Oct. 10, 1972

[54] PROTECTIVE MAIL MESH

[72] Inventors: Herbert Sobota, Warstein; Walter Siepmann, Sr.; Walter Siepmann, Jr., both of Belecke, all of Germany

[73] Assignee: Siepmann-Werke KG, Belecke/Moehnne, Germany

[22] Filed: Dec. 19, 1969

[21] Appl. No.: 886,684

[30] Foreign Application Priority Data

Dec. 27, 1968    Germany..........P 18 17 170.5

[52] U.S. Cl.................................................152/231
[51] Int. Cl..............................................B60c 27/06
[58] Field of Search...............152/243, 239, 170, 171

[56] References Cited

UNITED STATES PATENTS 3,382,906    5/1968    Muller et al. ...............152/243
2,179,983    11/1939    Nesbitt......................152/243
1,745,797    2/1930    Hoff et al...................152/243

Primary Examiner—James B. Marbert
Attorney—Michael S. Striker

[57] ABSTRACT

A protective mail mesh for vehicle tires comprises a tread strip for surrounding the tread face of a vehicle tire and two side strips for respectively overlying the side faces of the vehicle tire. The strips are each composed of a plurality of elements each of which comprises at least two discrete sections which are configurated so as to admit of releasable connection solely as a function of their respective configuration and which are releasably connected with one another with each section being connected with and secured against undesired release from the respective strip by at least one adjacent section.

14 Claims, 56 Drawing Figures

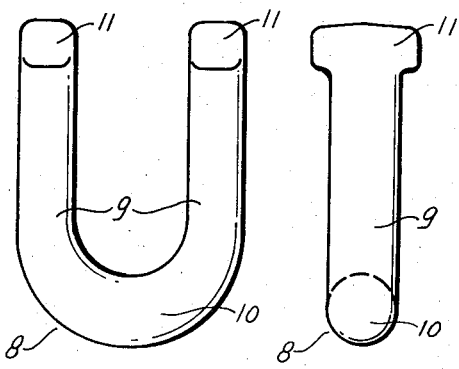
FIG. 9   FIG.10   FIG.11   FIG.12
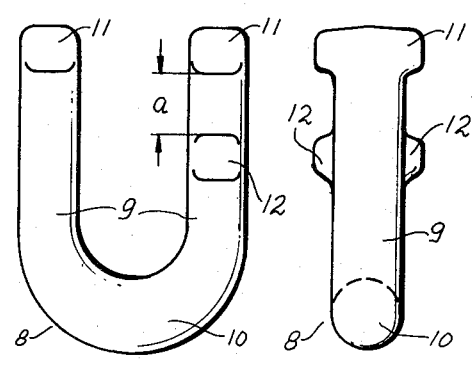
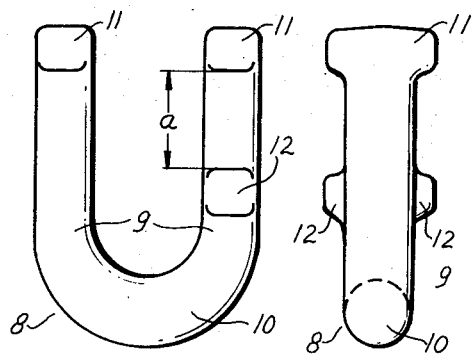
FIG.13   FIG.14   FIG.15   FIG.16
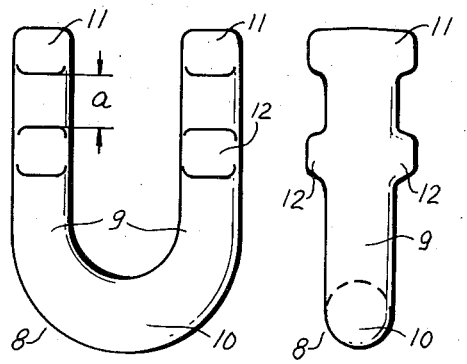
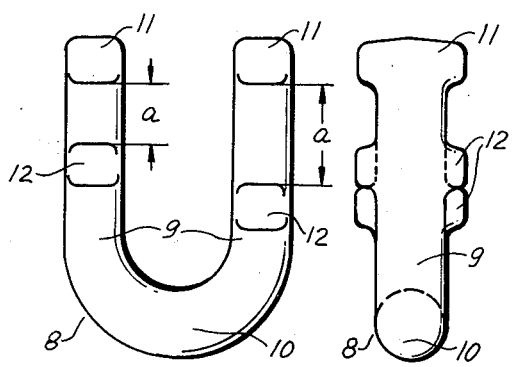
FIG.17   FIG.18   FIG.19   FIG.20
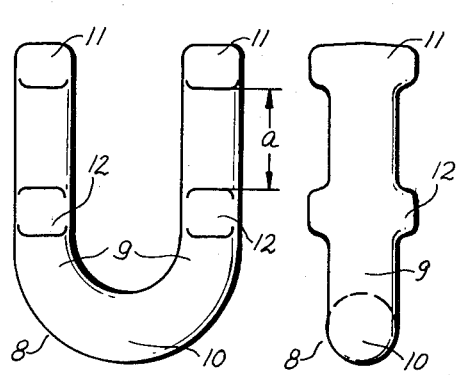

INVENTOR
HERBERT SOBOTA
BY WALTER SIEPMANN, Sr.
WALTER SIEPMANN, Jr.
ATTORNEY

PROTECTIVE MAIL MESH

BACKGROUND OF THE INVENTION

The present invention relates to mesh fabrics, and more specifically to a protective mail mesh. Still more specifically the invention is concerned with a protective mail mesh for protecting vehicle tires and the like.

It is well known that the tires of heavy construction machinery and vehicles, and analogous vehicles, which are used primarily on soft ground or on rocky uneven ground, must be protected. Clearly, if the vehicle is to be on very soft ground protection must be provided against sliding and to prevent the vehicle from becoming mired. Conversely, if the vehicle is used on very rocky and uneven ground it is necessary to protect the tires against damage by cutting, abrasion and similar occurrences.

The conventional chains which heretofore were used for this purpose, namely tire chains which consist of a plurality of chain links, suffer from a variety of disadvantages in this respect. Not only are they time-consuming and therefore expensive to produce, but they do not provide adequate protection. Their most outstanding drawback, however, is the fact that the links of such conventional chains must be welded, connected by threaded fasteners or in similar manner, which brings with it the disadvantage not only of time-consuming and expensive manufacture, but also the possibility of breakage or separation at the points of connection.

These drawbacks having been realized, an attempt has already been made to provide an improved protective mail mesh for vehicle tires. Again, however, this other known construction is not in fact a mesh construction or a net construction, but is in fact more a chain construction analogous to conventional tire chains. It consists of a plurality of individual chain links which are initially open, that is not circumferentially complete, and which once they have been connected by being inserted one through the other, are then welded shut. Of course, with this construction it is not necessary that each and every single one of the chain links be open, that is be circumferentially incomplete. Actually, every second one need only be circumferentially incomplete. Still, even in this construction every second chain link must be bent shut and thereupon welded closed so that the resulting construction is still time-consuming to assemble and expensive to manufacture. One of the factors here is that it requires significant amounts of energy to carry out the many welding operations necessary, and this is of course expensive. Furthermore, welding machinery must be kept on hand to carry out the assembly operation, and conventional welding machinery is not suitable for this purpose, so that a special machinery must be used which permits the welding to be carried out in the context of the chain link assembly.

A further problem is that such welding operations require the attention of highly skilled personnel to avoid improper welds and premature destruction of the chain fabric when it is used on vehicle tires. All of this means that even this somewhat improved prior art construction still is difficult and time-consuming to manufacture and therefore in the end result expensive to produce.

An additional drawback of these known constructions which require welding is the fact that they necessitate the use of such types of steel as can be readily subjected to welding operations. Certain types of steel, however, are highly resistant to ward and therefore very well suited for the purposes at hand except for the fact that they do not readily weld and are thus automatically disqualified from consideration. Therefore, in these known constructions it is necessary to make the selection of steel purely from the point of view of welding characteristics, forcing the use of such steels whose welding characteristics are good but whose resistance to wear is quite frequently inferior to that of other steels which cannot be used because they have inadequate welding characteristics. Ordinary steels, of course, are not hard enough to be used in the manufacture of these known chains. Therefore it is necessary to use steels which must undergo a subsequent heat treatment which can be carried out only after the welding process is completed, that is after the links are assembled into a chain. The reason for this is that if the heat treatment were to be carried out prior to the welding process, its effects would be negated by heating of the chain links as they undergo welding.

It is therefore necessary, after the chain has been completed and the various links assembled and welded, to place the chain into an annealing oven which, because of the very large sizes and weights of the chains involved—they are predominantly used for heavy vehicles having large tires—it is necessary that correspondingly large annealing ovens be used. On the other hand, such ovens are not standard commercial items and must be specially manufactured, which necessarily makes them expensive. Conversely, for economic and technical reasons it is not usually possible—with rare exceptions—to use these special ovens for general purposes other than for annealing of these particular special chains. This being the case it will be appreciated that frequently economic considerations make the purpose of these specialty ovens impossible so that the manufacturer of these chains in question is forced to utilize ovens which are available as standard items but which are so limited in their capacity that it is not generally possible to simultaneously heat treatment an entire chain for large vehicle tires. This, in turn, requires that the chain be assembled in sections which are of such size that they can be individually heated and subsequently connected. This subsequent connection, however, may not be carried out by welding because this would negate the effects of the heat treatment, as mentioned before. Therefore, the prior art relies necessarily on the use of special relatively complicated connecting links for joining these individually heat-treated sections to one another, thereby further increasing the manufacturing and sale price of the chains. Moreover, these special connecting links frequently are not as strong and resistant as the regular chain links and may even have such form and dimensions that they adversely influence the ability of the completed tire chain to conform itself to the tire and/or to uneven ground.

SUMMARY OF THE INVENTION

Accordingly, it is an object of the present invention to provide a protective mail mesh, particularly for vehicle tires, which is not possessed of the disadvantages outlined above.

It is a more particular object of the invention to provide such a mail mesh which can be manufactured in a most simple and much less expensive manner than was heretofore possible.

A further object of the invention is to provide such a mesh which provides very good support for the tire with respect to the ground as well as lateral guidance of the tire and protection of the tire against damage.

A concomitant object of the invention is to provide such a mesh which is not of the chain type known from the prior art, but which instead is truly a fabric, as its name already suggests.

In pursuance of the above objects, and others which will become apparent hereafter, one feature of the invention resides in a protective mail mesh for vehicle tires which, briefly stated, comprises a tread strip for surrounding the tread face of a vehicle tire and two side strips for respectively overlying the side faces of the vehicle tire. The strips are each composed of a plurality of elements each of which comprises at least two discrete sections so configurated as to admit of releasable connections solely as function of their respective configuration. The elements are releasably connected with one another and each of the sections is connected with and secured against undesired release from the respective strip by at least one adjacent section.

It is thus evident that the mail mesh according to the present invention may be assembled from the individual elements without requiring the use of separate connecting means, or without necessitating resort to welding. Accordingly, it can be assembled with a significant reduction in the time for assembly and in the expenses involved.

In fact, the time required for manufacturing a mesh according to the present invention amounts to at most a third of the time necessary for assembling known protective chains of the same size. This time reduction is largely the result of the elimination of the welding steps because the simple slide connection between the individual sections of the elements is clearly much quicker than the heretofore necessary welded connection between individual links of tire chains according to the prior art. Aside from this, it is now no longer necessary to supply the significant amounts of electrical energy heretofore needed for welding, nor the expensive apparatus for carrying out the welding process.

A further advantage of the construction according to the present invention is to be seen in the fact that the mesh can be assembled by unskilled help, reducing the manufacturing costs still further. In fact, no problems are involved in the use of unskilled help because, even if individual ones of the sections or elements of the mesh according to the present invention are improperly connected, this is of little consequence and does not require the so constructed mesh to be discarded. It is a simple enough matter to separate the improperly connected sections or elements manually, and to reinsert them properly, so that errors in assembly can be corrected quickly and inexpensively.

A further advantage of the construction according to the present invention is the fact that the elimination of all welding steps makes it possible to use any type of steel which is capable of meeting the requirements made, regardless of the particular welding characteristics of the steel. Thus, steels can be utilized which heretofore could not be used because they had improper welding characteristics. As mentioned before, there are steels whose wear and strength characteristics are highly advantageous but whose welding characteristics are not good so that heretofore they could not be used. It is thus possible according to the present invention to produce a mesh from steels which impart to the finished mesh wear characteristics much superior to anything heretofore possible to be obtained. Evidently, this is of great benefit in increasing the lifetime of the mesh.

If any annealing is necessary, it can be carried out on individual elements or sections thereof rather than requiring the initial connection of the sections into a mesh fabric and subsequent annealing. Accordingly, it is possible to use standard annealing elements which therefore are of course less expensive than the use of special ovens. Furthermore, these standard ovens are of course by and large much more economical than special annealing ovens because it can be used for a variety of purposes, and not exclusively for annealing sections of mesh fabric. In fact, in many instances such standard annealing ovens will always be available in the context of other manufacturing operations so that the manufacture of the mesh according to the present invention does not necessitate the economic investment involved in the purpose of such ovens in many circumstances.

This does not, in fact, exhaust the advantages obtained with the construction according to the present invention. Clearly, the previous necessity to manufacture the chains or, in the context of the present invention, mesh in individual sections which are then heat treated and subsequently connected, is eliminated. Instead, the individual members can be heat treated and subsequently assembled to form the mail mesh. There is now no need for special connecting members as was the case heretofore, except at the opposite ends of the tread and side strips where the same meet when the mesh has been placed around a vehicle tire, in order to provide a releasable connection to facilitate mounting and demounting of the mesh on the tire. In fact, if desired even these connecting members can be avoided and the mesh can be produced as an endless mesh which exclusively utilizes the elements and sections according to the present invention.

In accordance with an advantageous embodiment of the mesh according to the present invention the individual sections of respective elements are coupled with one another in a manner analogous to bayonet-type closures. They are separable from their respectively associated sections only when the sections of any given element are located in a predetermined position with reference to one another. This makes it possible to readily manufacture the individual sections by casting or forming without requiring the use of material-removing methods or apparatus; accordingly, such sections can be produced relatively inexpensively. Furthermore, such a connection is very stable so that relatively large forces can be transmitted without danger of lasting deformations or breaks.

A further advantage is that when the connection of the sections takes place analogous to a bayonet-type connection, the sections can be assembled and disassembled very readily so that the assembly of such mesh fabrics can be carried out by completely unskilled help without difficulty. Because the sections can be separated from one another only when they assume a specific predetermined position relative to each other, no special connecting means are required to maintain them in coupled position. Instead, it is simply necessary to assure that they cannot assume their relative release positions, which can be accomplished by so connecting the individual elements with one another that no section of any element can inadvertently move to the release position when the mesh is placed onto the vehicle tire.

According to a further embodiment of the invention each individual element may consist of at least two differently configurated sections of which one has the outline of a circumferentially complete flat and substantially oval annulus, whereas the other is approximately U-shaped and preferably much shorter than the annulus. This makes it basically possible to assemble a mail mesh according to the present invention by utilizing only two differently configurated sections, whereby evidently the manufacture and assembly of the mail mesh according to the present invention is simplified and made less expensive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 6–20 show six different embodiments of a U-shaped section according to the present invention, respectively shown in plan views and side views;

DESCRIPTION OF THE PREFERRED EMBODIMENTS

Figure 1:
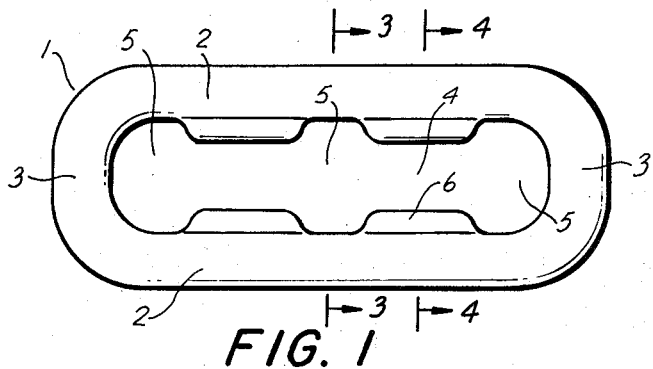
FIG. 1 is a side view of an oval annular section of an element according to the present invention.
Figure 3:
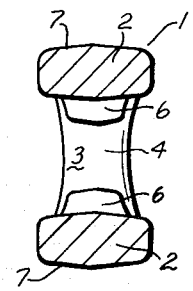
FIG. 3 is a section on the line III—III of FIG. 1.
Figure 4:
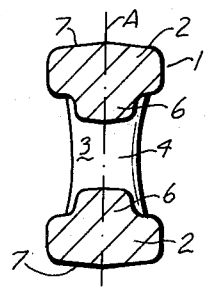
FIG. 4 is a section on the line IV—IV of FIG. 1.

FIG. 1 shows a substantially oval annular section 1 composed of two approximately parallel portions 2 which are connected with one another by two arcuately curved connecting portions 3. Thus, the section 1 has the form of a flat substantially oval annulus. It is provided with an opening 4 having three enlargements 5 and provided with projections 6 of substantially rectangular outline, as shown in FIGS. 2–4.

Figure 2:
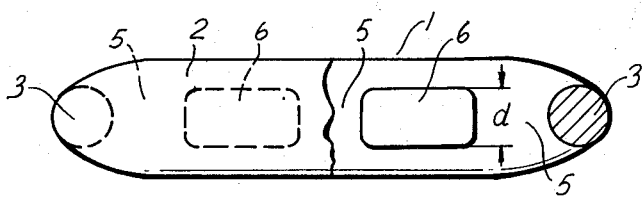
FIG. 2 is a top view of FIG. 1.

FIG. 2 shows that the cross-section of the portions 3 is smaller than the cross-section of the portions 2 which serve as supporting elements for the tire to which a mesh made utilizing the section 1 is applied, and which portions 2 therefore are subjected to greater wear and tear and must be thicker. The surfaces of the portions 2 which come in contact with the ground and with the tire, respectively, are identified with reference numeral 7. A comparison of FIGS. 3 and 4 with FIG. 2 will show that the cross-section of the portions 3 is substantially circular whereas the cross-section of the portions 2 is substantially rectangular. Because of this cross-sectional configuration of the portions 2 the surfaces 7 are particularly wide, that is they have a rather large surface area which is of importance for a reliable support of the tire. On the other hand, the substantially circular cross-sectional configuration of the portions 2 may provide for a considerable amount of freedom of movement of adjacent sections which extend into the outer enlargements 5 of the opening 4. The substantially circular cross-sectional configuration of the portions 3 largely avoids the possibility of hooking together, skewing and excessively large local wear. The longitudinal center plane extending through both of the portions 2 is identified in FIG. 4 with reference character A.

Reference numeral 8 in FIGS. 5–8 generally identifies the second section which, together with the first section shown in FIGS. 1–4, makes up an element for a mail mesh according to a preferred embodiment of the invention. It is to be understood that to assemble one element it is necessary in accordance with this particular embodiment to have one each of the sections 1 and 8 as shown in FIGS. 1–4 and 5–8, respectively.

The section 8 shown in FIGS. 5–8 is substantially in U-shaped configuration having two arms 9 and a bight 10 which is arcuately curved and connects the arms 9. In the illustrated embodiment the arms 9 are straight whereas the bight 10 is curved in substantially semi-circular form. The cross-sectional configuration of the arms 9 and the bight 10 is substantially circular and of substantially identical area. However, it is possible and in fact it may be advantageous to make the cross-sectional area of the bight 10 slightly larger than that of the arms 9.

Figure 7:
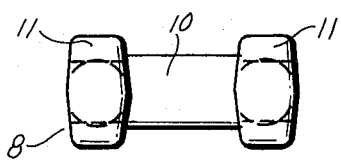
FIG. 7 is a front view of the embodiment in FIG. 5.
Figure 8:
FIG. 8 is a section taken on the line VIII—VII of FIG. 6.

The free ends of the arms 9 are each provided with a projection 11 which in the illustrated embodiment (compare FIG. 6) is substantially hammer-headed in shape. The projections 11 extend beyond the outer outline of the arms 9 at two sides, namely normal to the plane A' which extends through the arms 9 and the bight 10 and is a plane of symmetry. FIGS. 7 and 8 clearly show the cross-sectional configuration of the projections 11, with FIG. 8 being a section taken on the line VII—VIII of FIG. 6.

Figures 5, 6:
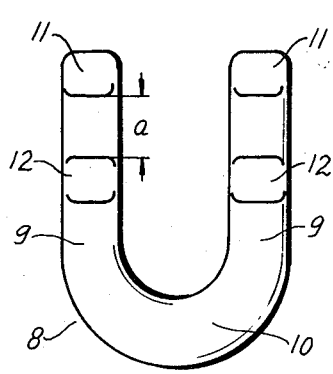
FIG. 5 is a top view of a U-shaped section according to the present invention.
FIG. 6 is a side view of the embodiment in FIG. 5.

In the embodiment of FIGS. 5–8 each of the arms 9 is further provided at opposite sides with two additional projections 12 which are arranged and configured in the same manner as the projections 11. The distance between the projections 11 and 12, identified with reference character $a$ in FIG. 5, is at least equal to substantially the thickness of the section 1 in the region of its opening 4, and therefore equal to the thickness of the projections 6 which are identified with reference character $d$ in FIG. 2.

FIGS. 9 and 10 show that it is also possible to construct the element 8 without the projections 12. It is emphasized, however, that the projections 11 must be provided under all circumstances.

The section 8 shown in FIGS. 11 and 12 is provided on one of its arms 9 with a projection 11 whereas the other arm 9 is provided with a plurality of the projections 11 and 12 analogous to FIGS. 5–8.

In the embodiment of FIGS. 13 and 14 the spacing $a$ between the projections 11 and 12 is particularly large and corresponds to approximately 1.5 – 2.5 times the thickness $d$ of the section 1 and its projections 6. With this embodiment the U-shaped section 8 may be axially shifted with reference to the section 1, with the movement being limited by the projections 12.

The embodiment illustrated in FIGS. 15 and 16 corresponds to that of FIGS. 5–8 and has been reproduced to show this particular embodiment in the context of the various embodiments suitable for the section 8.

The embodiment of FIGS. 17 and 18 constitutes a combination of the embodiments of FIGS. 13 and 15 with the distances $a$ between the projections 11 and 12 on the respective arms 9 being of different size.

The embodiment illustrated in FIGS. 19 and 20 is analogous to that shown in FIGS. 15 and 16 except that the distances $a$ between the connections 11 and 12 are substantially larger than in the embodiment of FIGS. 15 and 16.

Figure 21:
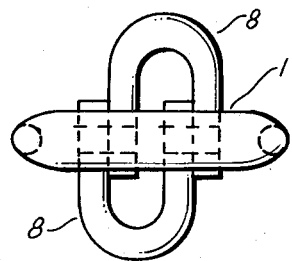
FIGS. 21–28 show four different assembled elements according to the present invention, each element being shown in successive Figures in a plan view and with a side view of the respective oval annular section utilized.
Figure 22:
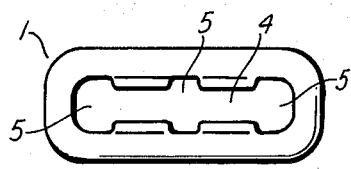

In FIG. 21 I have shown an assembled element of a mail mesh according to the present invention, consisting of a section 1 as illustrated in FIGS. 1–4 and two U-shaped sections 8 which may be of any of the embodiments illustrated in FIGS. 5–20. When this element is assembled, the two sections 8 are inserted into the enlarged portions 5 of the section 1 on opposite sides in such a manner that their projections 11 extend through the enlarged portions 5 of the opening 4. It is emphasized that this must be carried out successively and not simultaneously, because with the insertion of each section 8 one arm 9 must enter through the center enlarged portion 5 which can accommodate only one arm 9 with its projection 11 at one time. Thus, only after the first inserted section 8 has for instance been placed through the center and left-hand enlarged portions 5 of the opening 4 and has subsequently been moved towards the right, can the second section 8 be inserted in the same manner from the other side of the section 1 into the center and right-hand enlarged portions 5 and thereupon be shifted towards the left. Once the sections have been assembled in this manner, only the enlarged portions 5 remain unobstructed, with the outermost enlarged portions 5 being largely filled by the sections 8 of adjacent elements. The center enlarged portion 5 remains open because as a result of the fact that the outermost enlarged portions 5 are largely filled by the presence of the sections 8 of adjacent elements, no arm 9 of the sections 8 associated with the section 1 is capable of moving into the center enlarged portion 5. For comparison purposes FIG. 22 shows the section 1 utilized in FIG. 21 in a side view, to more clearly illustrate the relationships.

Figure 23:
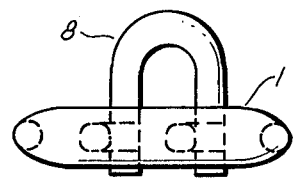
Figure 24:
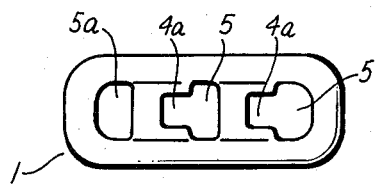

The element illustrated in FIG. 23 utilizes only two sections, namely a section 1 which is shown in side view in FIG. 24 for comparison purposes, and a U-shaped section 8. In this embodiment the element assembled from the sections 1 and 8 has one horizontal and two vertically arranged eyes into which sections of adjacent elements may engage. This difference by comparison with the embodiment in FIG. 21 results from the fact that FIG. 23 utilizes only a single section 8. In this case it is necessary only that two enlarged portions 5 be present for the projections 11 and two normally wide opening portions 4a which accommodate the end portions of the arms 9. It is possible to utilize a section 1 such as is shown in FIG. 22 in which case the section 8 will have somewhat more play in longitudinal direction of the section 1 but is incapable of becoming unintentionally separated therefrom because to do so it would have to enter into one of the outer enlarged portions 5 which is not possible because they are substantially filled by the non-illustrated sections of adjacent elements. However, the element 1 in the embodiment of FIG. 23 is advantageously configurated as shown in FIG. 24 and provided with three different openings of which two consist of the normally dimensioned opening portions 4a and enlarged portions 5 whereas the third opening is identified with reference numeral 5a and serves only for the connection to a section of an adjacent element.

It should still be pointed out that it is also possible in the embodiment of FIG. 21 to so construct the element 1 that its opening 3 is subdivided into three opening portions 4a associated with an aligned portion 5. In this case the arms 9 of the two sections 8 utilized in FIG. 21 would not directly abut, but instead a portion of the section 1 would always be located between them. In such a construction it would be an advantage that the section 1 would have a higher mechanical strength, as is the case in the section 1 shown in FIG. 24.

It is emphasized here that like reference numerals have deliberately been utilized for differently configurated sections 1 and 8, in order to point out that while their specific configuration may differ they all have the similar characteristic of being connectable with one or more associated sections without welding and without the use of separate connecting means.

Figure 25:
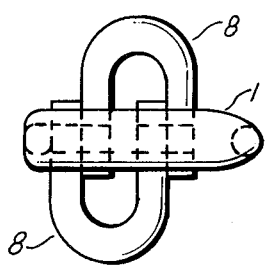
Figure 27:
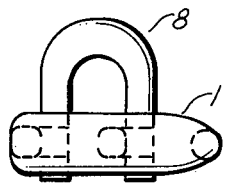
Figure 26:
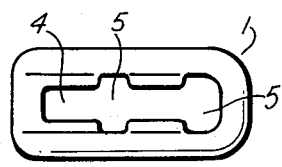
Figure 28:
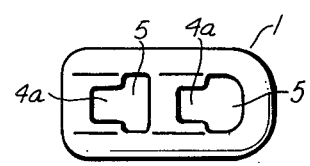

The embodiments illustrated in FIGS. 25 and 26, and in FIGS. 27 and 28, respectively, are thought to be self-explanatory. In FIG. 25 the assembled element has two horizontal eyes but only a vertical eye for engagement of sections of adjacent elements, by contrast to the embodiment of FIG. 21. The reason for this is that the section 1 in the embodiment of FIG. 25 has only one outer enlarged portion 5 as shown in FIG. 26. Otherwise the section 1 in FIG. 26 corresponds to that shown in FIG. 22.

In the element shown in FIG. 27 only one each horizontal and vertical eye is present for engagement of sections of adjacent elements. This is somewhat analogous to the embodiment illustrated in FIG. 23 but with the left-hand opening 5a being omitted in the section 1, as evident from a comparison of FIG. 28 with FIG. 24.

Figure 29:
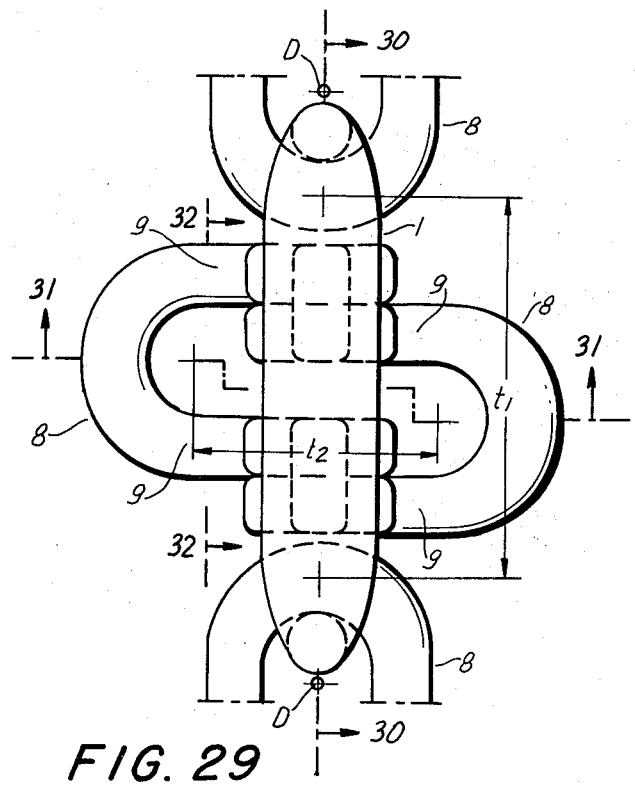
FIGS. 29–32 show the element of FIG. 21 on an enlarged scale in a plan view and in sectional views taken on the lines XXX, XXXI and XXXII, respectively.
Figure 30:
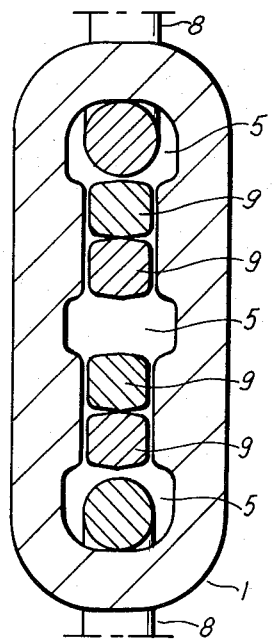
Figure 31:
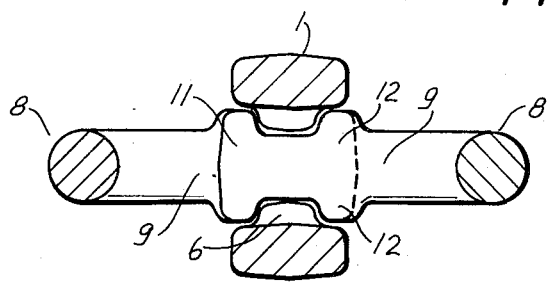
Figure 32:
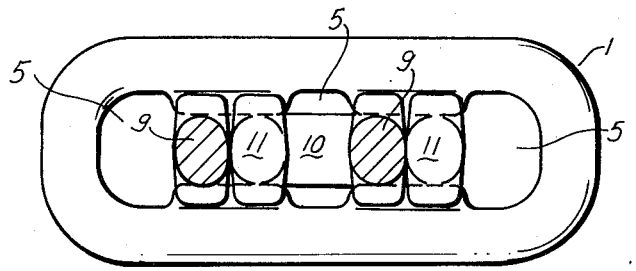

FIGS. 29–32 illustrate how the sections 1 and 8 of an element according to FIG. 21 are coupled with one another and how two adjacent U-shaped sections 8 engage in the outermost enlarged portions 5 of the section 1. The reference numerals are the same as in the preceding embodiments. FIG. 29 further shown dimensions $t_1$ and $t_2$. The dimension $t_1$ is substantially larger than that identified as $t_2$. The dimension $t_1$ results from the configuration of the section 1 whereas the dimension $t_2$ depends upon the configuration of the sections 8, and it is advantageous that $t_1$ is larger than $t_2$. If this is the case, the distance between the two pivot points D of the two adjacent sections 8 with reference to the section 1 is also correspondingly larger. The different dimensions between the spacing of the pivot points D relative to one another and the distance $t_2$ are the actual reason for the fact that a mail mesh produced from the elements according to FIG. 29 has good shear characteristics and can therefore be particularly tightly and safely secured on the tire.

Figure 33:
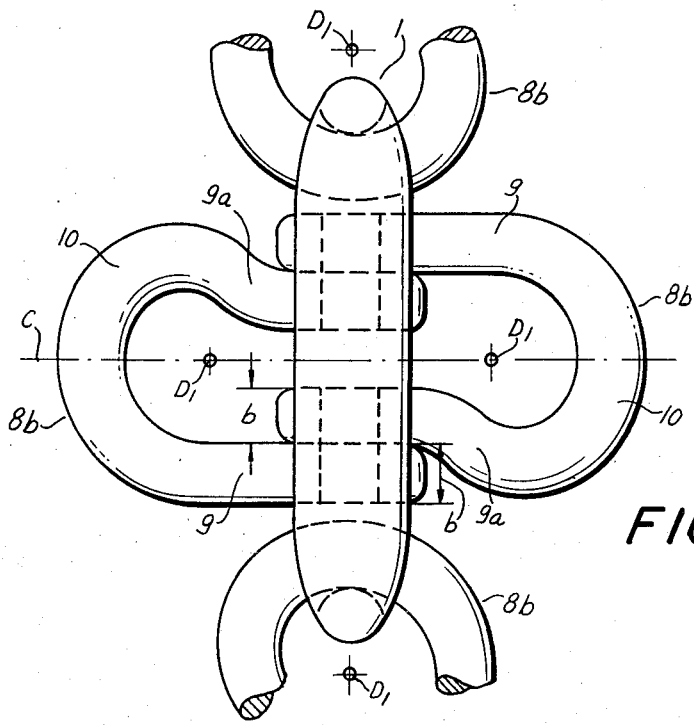
FIG. 33 is a plan view of a further embodiment of an element according to the present invention.

The embodiment in FIG. 33 is reminiscent of that of FIG. 29, from which it differs in that the configuration of the sections 8b is different from that of the sections 8 described previously. The difference is that in the sections 8b only one of the two arms 9 is straight whereas the other arm is offset inwardly towards the first mentioned straight arm 9 in the region of its juncture with the bight 10. In the embodiment of FIG. 33 this offset is so selected that it corresponds to the thickness b of the straight arm 9, as measured in the plane A' which is not identified in FIG. 33. With this construction the pivot points $D_1$ for the adjacent elements are located in a common plane C.

Figure 34:
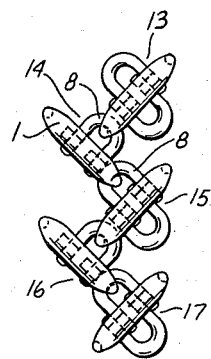
FIGS. 34–42 are plan views illustrating the assembly of elements according to FIGS. 21 and 29 into a protective mail mesh, and showing different assembly phases.

FIGS. 34–42 show how elements according to FIGS. 21 and 29 are connectable to form a protective mail mesh according to the present invention. In FIG. 34 an assembled element is identified with reference numeral 13. This constitutes the start of the assembly. Now, a section 8 of an adjacent element 14 is inserted through the left-hand enlarged portion 5 of the oval section 1 of the element 13 and in turn connected with its own oval section 1. Now, a section 8 of a further element 15 is inserted into the right-hand enlarged portion 5 and thereupon the element 15 is completely assembled. Now further elements 16 and 17 are connected in the same manner as described before.

Figure 35:
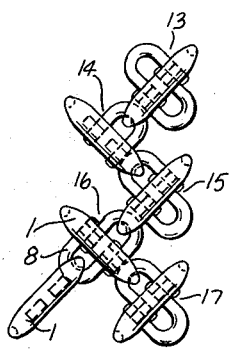
Figure 36:
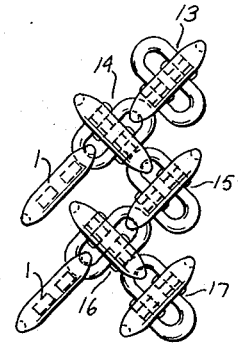
Figure 37:
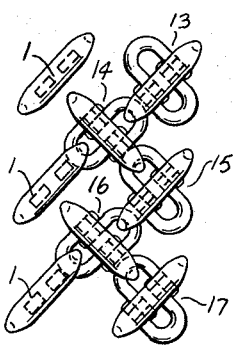

FIG. 35 shows that the element 16 is provided already with its second section 8 which has first been placed through the right-hand enlarged portion 5 of a separate section 1 before it is introduced into the section 1 which constitutes a part of the element 16. The same is also carried out with respect to the assembly of the element 14, as shown in FIG. 36, so that two sections 1 are connected with the already assembled and coupled elements 13–17. FIG. 37 shows that an additional section 1 has been added which is located to the left of and above the element 14. This additional section 1 is also connected to a non-illustrated element which in turn is coupled with the element 13, analogous to the connection between the elements 14 and 15.

Figure 38:
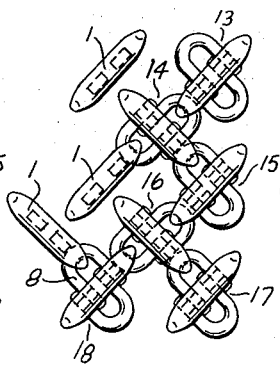
Figure 39:
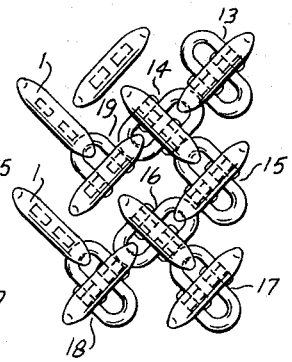
Figure 40:
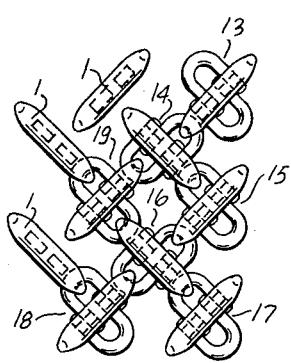

FIG. 38 shows the insertion of two sections 8 into the lower section 1 which is coupled with the element 16, whereby a new complete element 18 has been obtained. Before the left upper section 8 of the element 18 has been inserted, it is first placed through the right-hand enlarged portion 5 of a further section 1 whereby a new but not yet complete element 19 is obtained which is already connected with the element 14 and which is connectable with the element 16 by adding a second section 8. FIG. 39 shown how this is accomplished, and FIG. 40 shows the connection completed.

Figure 41:
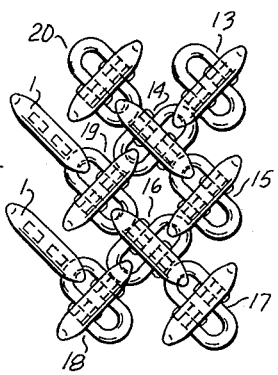

FIG. 41 shows that the section 1 which is located to the left and above the element 14 and which in FIGS. 37–40 has been illustrated for a better understanding, is assembled to form a new complete element 20 which is connected with the element 14. FIG. 1 shows that it is then only necessary to provide two additional sections 1 located to the left and above the elements 18 and 19 and which can readily be connected with the elements 19 and 20 by means of additional sections 8 as shown in FIG. 42.

Figure 42:
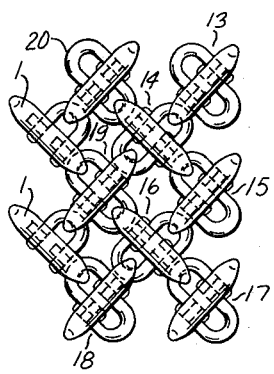

A comparison of FIGS. 34 and 42, especially the left marginal areas thereof, shows that in both figures the left marginal areas are the same expecting that the section of the mail mesh has been increased by a total of five complete elements 14, 16, 18, 19 and 20. It is thus clear that in this manner a protective mail mesh of any desired size may be assembled.

Figure 43:
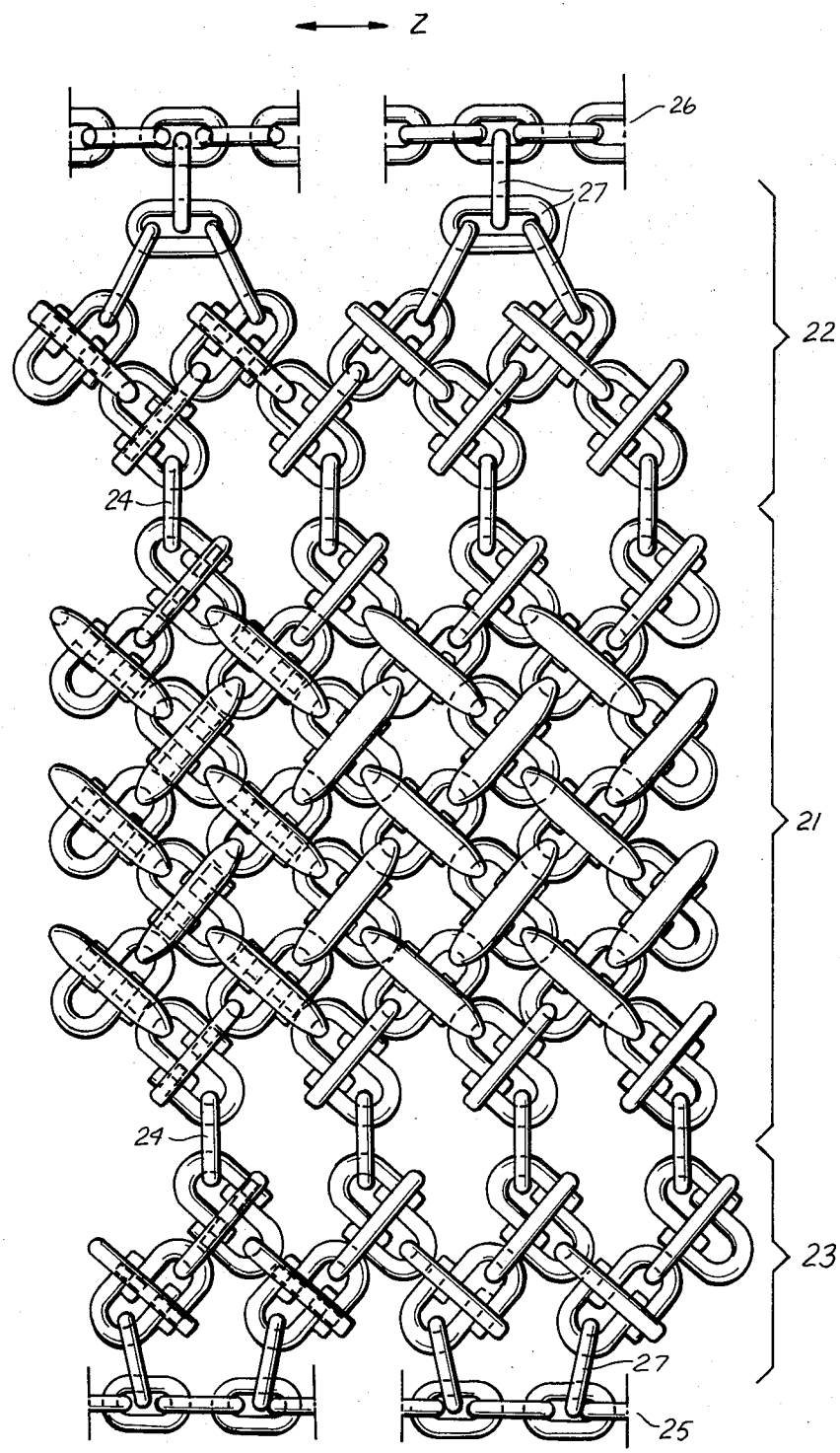
FIGS. 43–46 show two lengths in plan views and of differently constructed meshes according to the present invention.

FIG. 43 shows a fragment of a mail mesh which has been assembled in this manner. This is a longitudinal fragment which is subdivided into several parts transversely to the direction of movement of a tire to which it is applied and which direction is identified by the arrow z. First, there is the actual thread strip 21 of relatively narrow mesh which covers the tread face of the tire and is substantially composed of individual elements according to FIG. 21, assembled in the manner illustrated in FIGS. 34–42.

Laterally adjacent the tread strip 21 are the side strips 22 and 23 which in the embodiment of FIG. 43 are differently configured from one another but which may also be identical. In this embodiment the side strips 22 and 23 are connected with the tread strip 21 by means of conventional oval links 24. It is not necessary, however, to weld these oval links 24 of conventional construction, because both the elements of the side strips 22 and 23 and those of the tread strip 21 can be hooked into the connecting links 24.

The marginal elements of the tread strip 21 which are associated with the side strips 22 and 23 are composed not of elements such as shown in FIG. 21, but instead of elements such as shown in FIG. 25. The reason for this is that at this location only one vertical but two horizontal eyes are needed. This is true also of the elements of the side strips 22 and 23 which are also in conformance with the embodiment of FIG. 25.

The side strips 22 and 23 are respectively provided with lateral chains 25 and 26. Advantageously the chain 26 is located at the outer side of the tire, that is the side facing away from the vehicle. The chain 26 is connected with the side strip 23 by means of several welded conventional chain links 27 and it is advantageous during the manufacturing process to use completed chain sections, that is sections of conventional completed chains. This is readily possible because the chains 25 and 26 and their links 27 which connect them with the strips 22 and 23 do not actually come into contact with the ground and therefore are subjected only to tensile stresses but not to actual wear. The chain 25, which is preferably located at the inside of the tire, that is that side facing the vehicle, is connected with its associated side strip only with individual coupling members consisting of conventional chain links 23 which are welded. This is shown in FIG. 43 and it is emphasized that the welding is carried out at such time as the chains 25 and 26 and the links 27 are not yet connected with the strips 22 and 23 and the strip 21 respectively. Instead, the chains 25 and 26 and the links 27 are manufactured separately so that welding may be carried out in a simple manner and a transmittal of the heat of the welding to the elements of the strips 22 and 23 as well as the strip 21 is reliably avoided.

Figure 44:
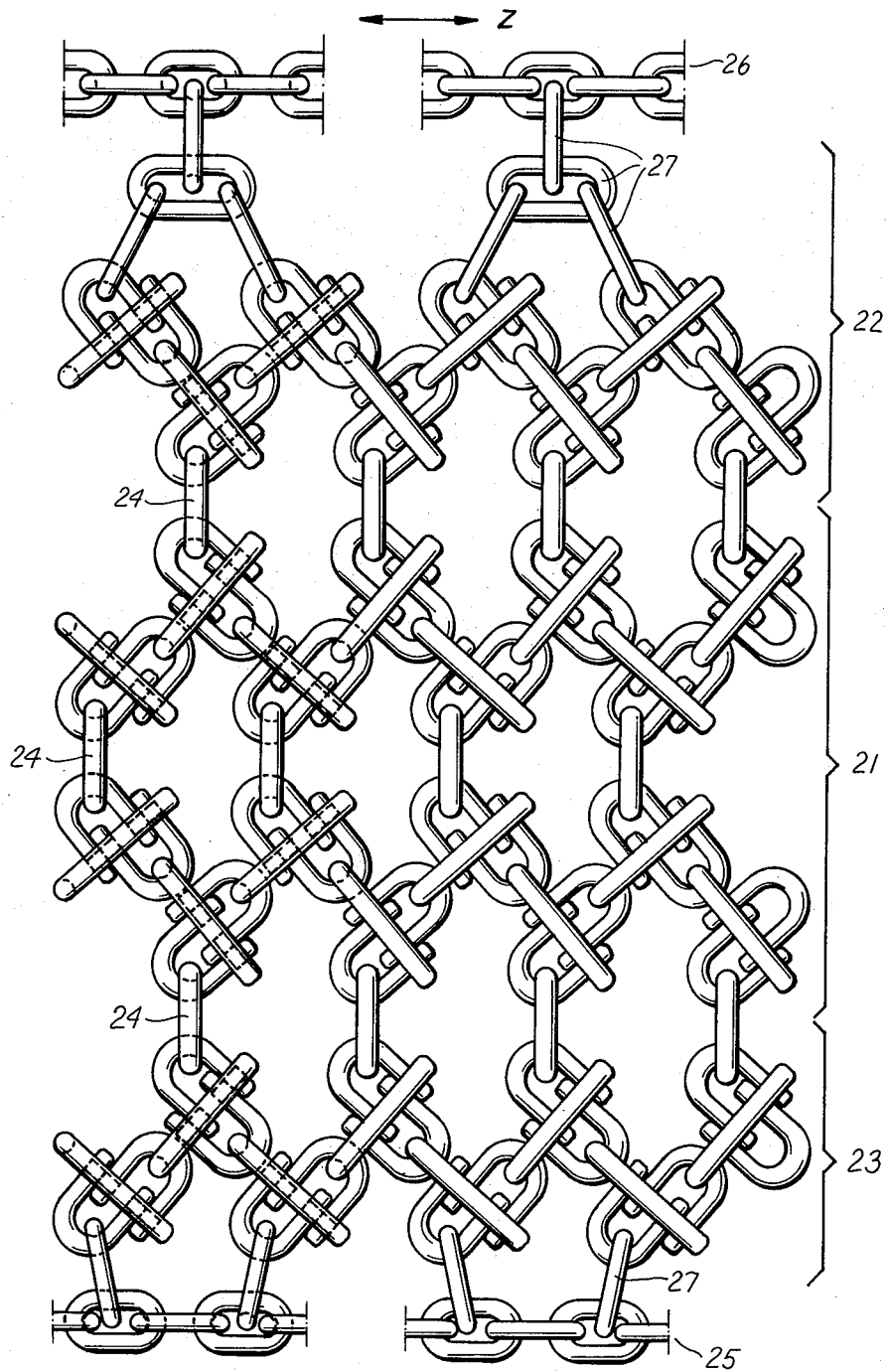

FIG. 44 shows a further embodiment of a protective mail mesh according to the present invention, with both the tread strip 21 and the side strips 22 and 23 consisting substantially of individual elements according to the embodiment of FIG. 25. The tread strip 21 produced in this manner is relatively of fine mesh and the individual elements are tightly and manifold connected by the connecting links 24 which, as already stated earlier, need not be welded so that they can be made out of the same highly wear resistant material as for instance the sections 1 of the other elements.

Figure 45:
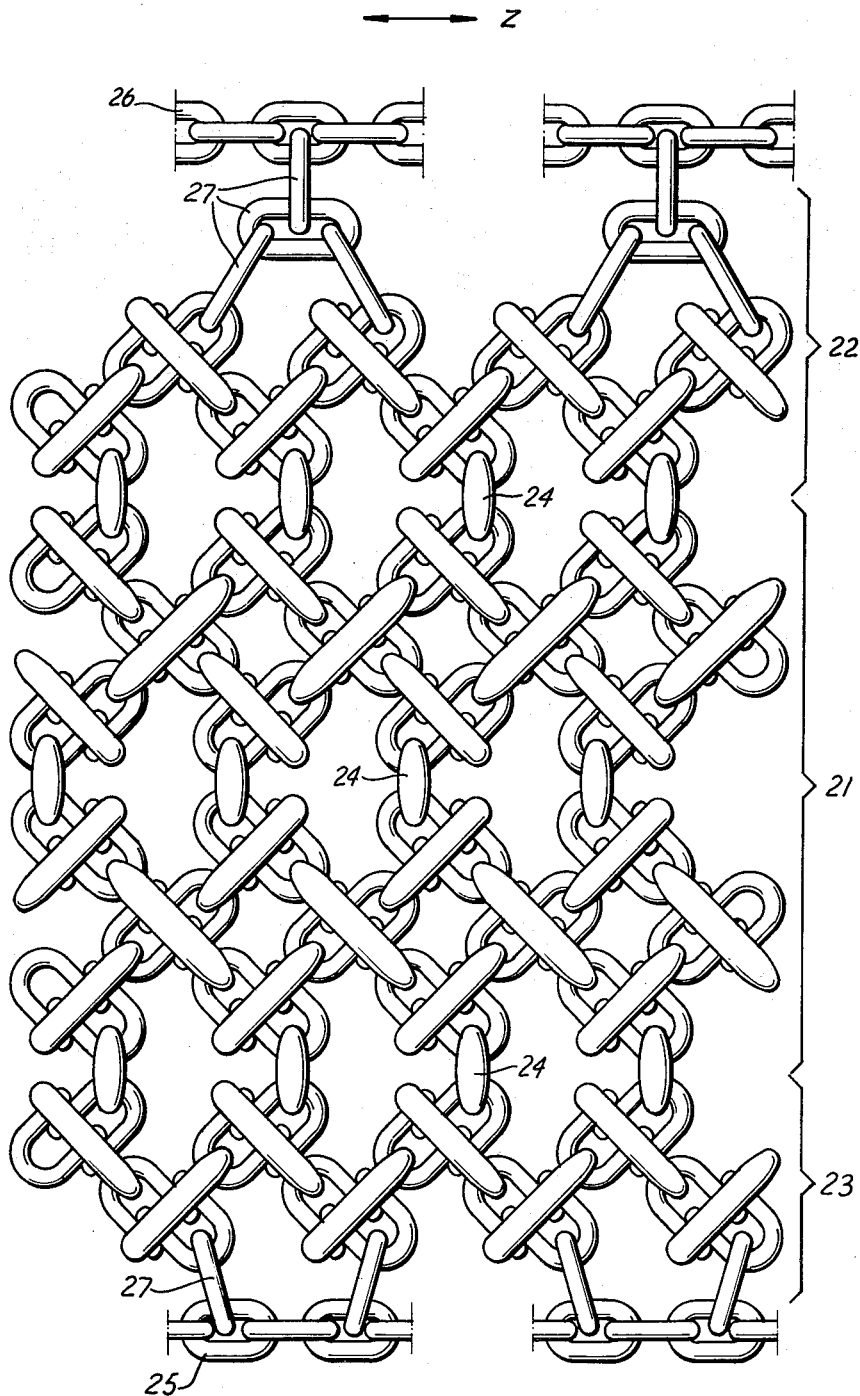

A still further embodiment of a protective mail mesh according to the present invention is shown in FIG. 45. Here, the tread strip 21 is composed of a combination of individual elements according to the embodiment of FIG. 21 as well as an individual element according to the embodiment of FIG. 25. Some of these are directly connected with one another and others are connected with one another via the coupling links 24. The tread strip 21 obtained in this manner is not as fine mesh as that of FIG. 43 but on the other hand its mesh is not as large as in FIG. 44. The side strips 22 and 23 correspond substantially to those shown in FIGS. 43 and 44, but need not be configurated in that manner.

Figure 46:
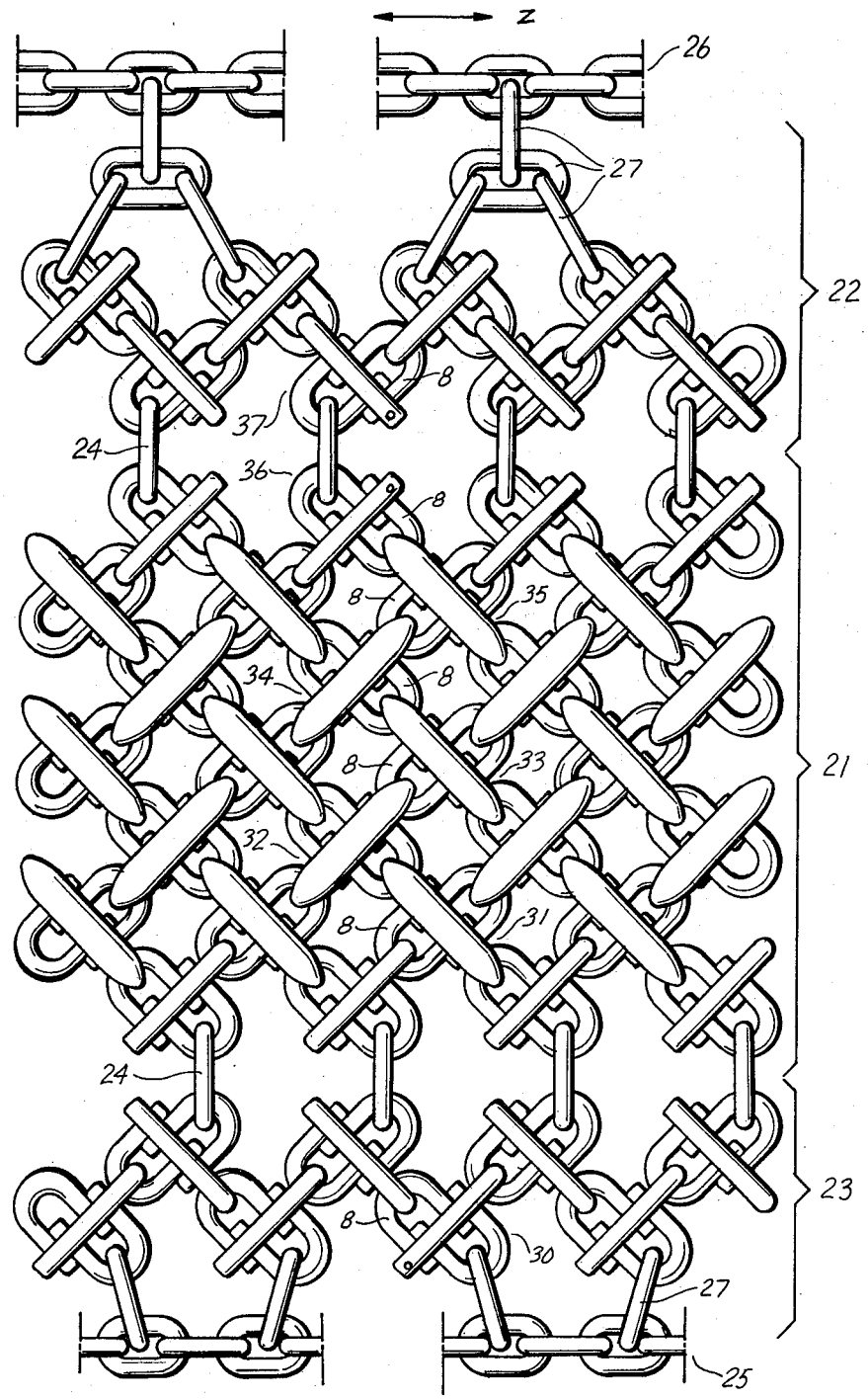
Figure 50:
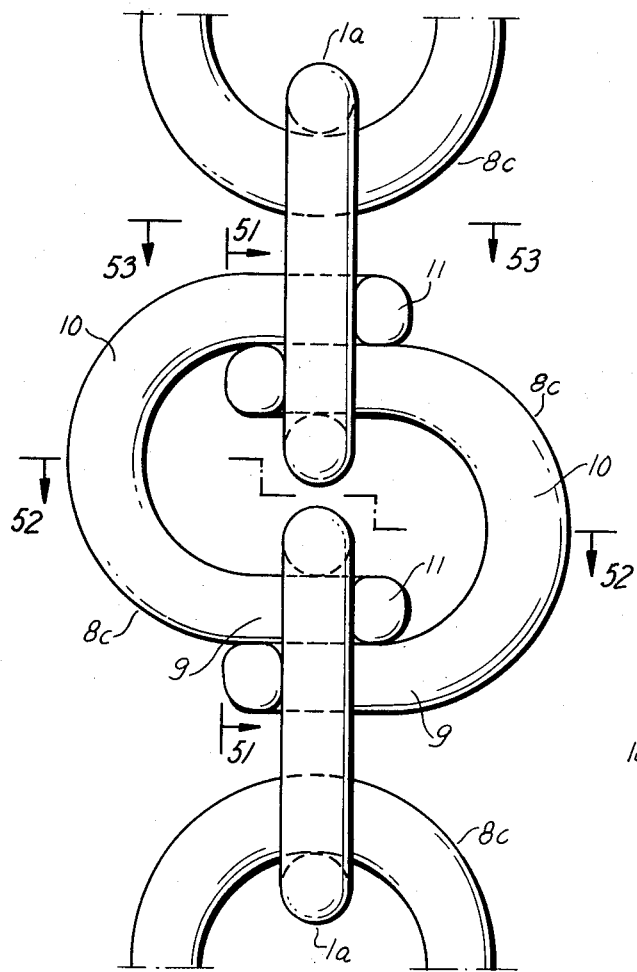
FIGS. 50–53 illustrate, on an enlarged scale, a further embodiment of an element according to the present invention, shown in a plan view and in sections taken on the lines LI, LII and LIII of FIG. 50.
Figure 51:
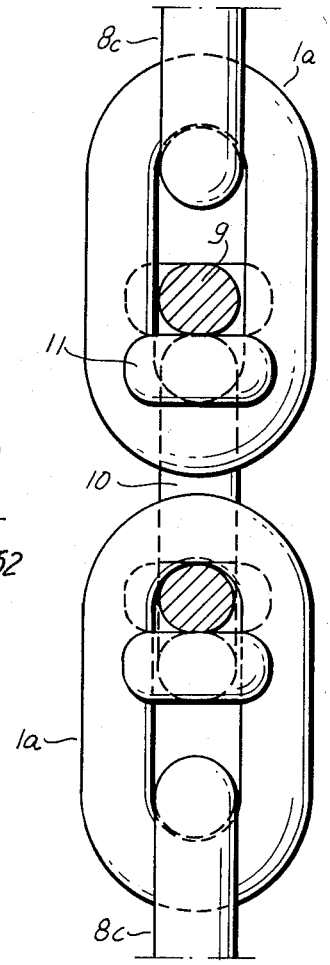
Figure 52:
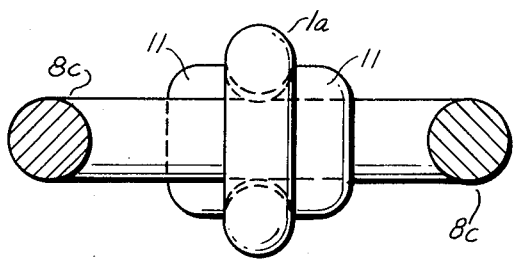
Figure 53:
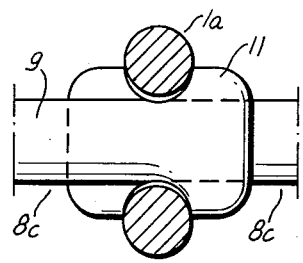

FIG. 46 shows a tread strip 21 of particularly narrow mesh. It is composed of the individual elements according to the embodiment of FIG. 21, as is the case with the tread strip of the embodiment in FIG. 43. However, by a specific arrangement of the elements with reference to one another the tread strip 21 in FIG. 46 is provided with a narrower-mesh configuration than that of FIG. 43. A close comparison of FIGS. 43 and 46 shows—particularly by considering an individual mesh opening in conjunction with its four elements which define it—that in FIG. 43 the mesh openings of the tread strip 21 are of different sizes whereas in FIG. 46 they are of identical sizes. The reason for this is that in FIG. 46 the individual elements are so arranged that of any two transversely spaced elements—such as the elements 32 and 34—the U-shaped sections 8 of the same which delimit the mesh opening between the elements 32 and 34, are so arranged on the elements 32 and 34 that the mesh opening between them is as large as possible. As is evident from FIG. 46, where the opening is defined at its lower edge by the element 32 and at the upper edge by the element 34, is defined at the left and right edges by the elements 33 and a further not separately designated element, respectively. These latter two elements thus also delimit the opening with their respective U-shaped sections 8 but these, in contrast to the sections 8 of the elements 32 and 34, are so arranged at their respective elements that in this direction—that is from the left to the right edge of the opening—as small as possible a dimension is obtained. The mesh openings in FIGS. 46 are therefore all of the same size, and are smaller than the largest and larger than the smallest mesh openings in the tread strip 21 of the embodiment of FIG. 3. This is by contrast to FIG. 3 where the sections 8 of each element are so arranged that all sections 8 which delimit a mesh opening are either as far as possible from one another or as close as possible to one another so that ultimately they are provided with relatively large or relatively small adjacent mesh openings.

It is clear from what has been set forth that by particular arrangement and selection of the individual elements it is possible to assemble a large variety of different tread strips 21 as well as side strips 22 and 23, in dependence upon the desired use and the desired characteristics. Evidently, further arrangements beyond those in FIGS. 43–46 are possible although their illustration would clearly exceed the scope of the present specification.

When the mesh strips are initially assembled they are elongated and have spaced ends. In order to connect these spaced ends and form them into an endless protective mail mesh for a tire, it is necessary to provide a suitable connection. FIG. 46 shows how this may be effected without the use of separate connecting elements, and this will be explained—considering that in FIG. 46 the spaced ends are illustrated as already being connected—by detailing how they can be connected without having to destroy any sections or elements. From this explanation it will become evident how simply by reversing the described disassembly procedure, the spaced ends can be connected.

The disassembly procedure may for instance be initiated by beginning with the side strip 23, for instance with the element 30 thereof. This element 30 has an annular section which is provided with a bolt, screw or the like identified by the small circle and which prevents the separation of the associated sections 8. When this bolt, screw or the like is released, the sections 8 may be moved lengthwise of the section 1 of the element 30 to their release position, so that the sections 8 and 1 can be separated from one another. Reference should here be had to FIGS. 25 and 26 where the illustrated element would correspond to the element 30 of FIG. 46 if the left-hand portion of the section 1 is replaced by a removable bolt, screw or the like. It will be appreciated that once the element 30 has been separated, the section 8 thereof can be removed from the enlarged portion 5 of the section 1 of the left-hand adjacent element, whereby the side strip 23 is already separated at this point. The same may be done with the element 37 of the side strip 22, and a similar disassembly operation may now be carried out with respect to the tread strip 21. This is accomplished by separating the element 36 thereof in the same manner as described before, thereby making it possible to remove its section 8 from the oval annular section 1 of the adjacent element 35 which then can be separated and now enables the successive separation of the elements 34, 33, 32 and 31, whereupon the tread strip is separated at its opposite ends. To connect the opposite ends of the tread strip and the side strips the just described procedure is simply reversed.

Figure 47:
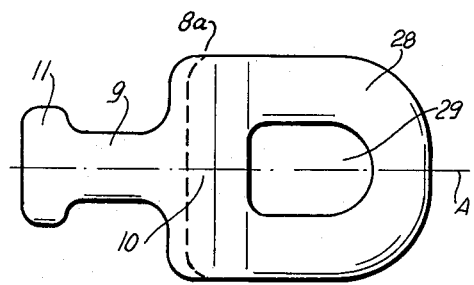
FIGS. 47–49 are a side view, plan view, and front view of a U-shaped section according to a further embodiment of the invention.
Figure 49:
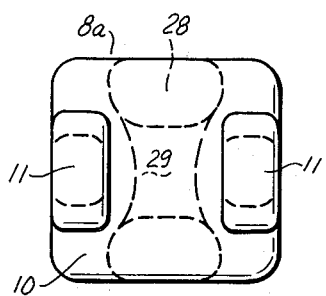
Figure 48:
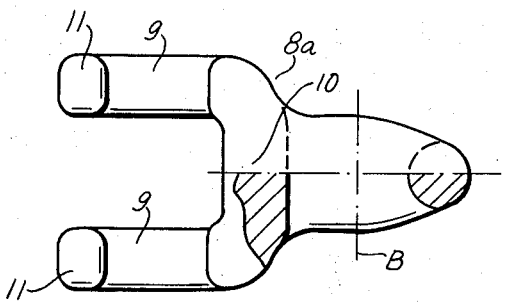

It is of course also possible to use separate connecting elements. These may be of particularly simple construction if the end elements located at the opposite spaced ends of the respective strips are provided exclusively with vertical eyes. This can be accomplished by replacing in these particular elements the sections 8 of FIGS. 5–20 with sections 8a such as are illustrated in FIGS. 47–49, and whose configuration is particularly clearly shown in FIGS. 47 and 48. The left-hand side of these is configurated in the same manner as in the sections 8 of FIGS. 5–20. It is also possible to provide a configuration according to FIG. 33 and to make one of the arms offset.

However, in contrast with the sections 8 and 8b, the section 8a of FIGS. 47–49 is provided with a closed eye 28 on that side of its bight portion 10 which faces away from the arms 9. The longitudinal center plane of the opening 29 of the eye 28 is identified with reference designation B and thus is in parallelism with or coincident with the plane A' of the section 8a. FIGS. 47–49 clearly illustrate the configuration of the eye 28 and its opening 29 and it is evident that, as illustrated in FIG. 49, the provision of the eye 28 makes it necessary to enlarge the bight portion 10 and to make it of substantially quadratic cross-section.

The embodiment of the invention which is illustrated in FIGS. 50–53 shows an individual element which is composed of four sections, with two oval annular sections 1a being identical and corresponding substantially to the sections 1 previously discussed. The other two sections 8c are also identical and correspond substantially to the sections 8 according to FIGS. 5–20, but may also correspond to the sections 8a according to FIGS. 47–49 or 8b according to FIG. 33.

FIGS. 50–53 correspond substantially to FIGS. 29–33 and show how the sections 1a and 8c are connected with one another and in which manner adjacent sections 8c engage in the respectively outermost portions of the sections 1a. The dimensions $t_1$ and $t_2$ as well as the pivot points D are not shown in these figures but correspond analogously to the dimensions illustrated in FIGS. 29–32.

Figure 55:
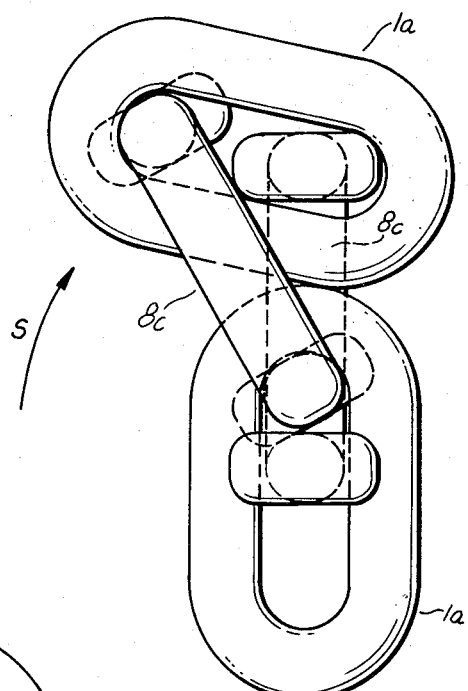
FIGS. 54 and 55 show in side views two different assembly phases of the element according to FIGS. 50–53.
Figure 54:
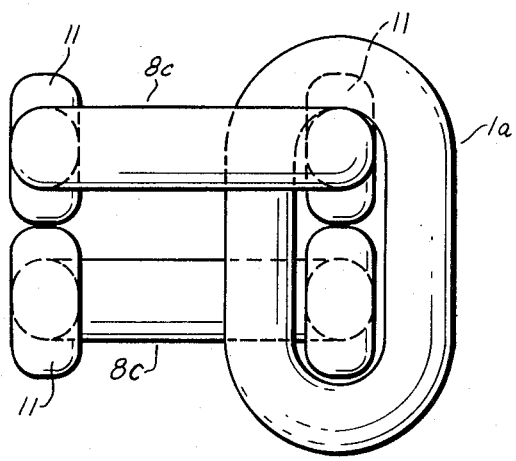

FIGS. 54 and 55 show how the arms of the sections 8c are inserted into the opening of a section 1a. First, one arm of each of the sections 8c is introduced through the opening of the section 1a in such a manner that the sections 1a and 8c assume the positions illustrated in FIG. 24 with respect to the section 1a and the uppermost section 8c. The right-hand projection 11 has passed completely through the opening of the section 1a and is located at the read side of the section 1a which faces away from the viewer. Now the lowermost section 8c is inserted from this rear side through the section 1a, as shown in FIG. 54. In the same manner the other arms, respectively the other two projections 11 of the sections 8c are inserted through the opening of the second section 1a. To move the thus connected sections 1a to operative position they must be displaced in the direction of the arrow S as shown in FIG. 55, and this movement must continue beyond what is shown in FIG. 55—or rather the tilting movement of the upper of the sections 1a must go beyond what is shown in FIG. 55 until both of the sections 1a are arranged coaxially with one another.

Figure 56:
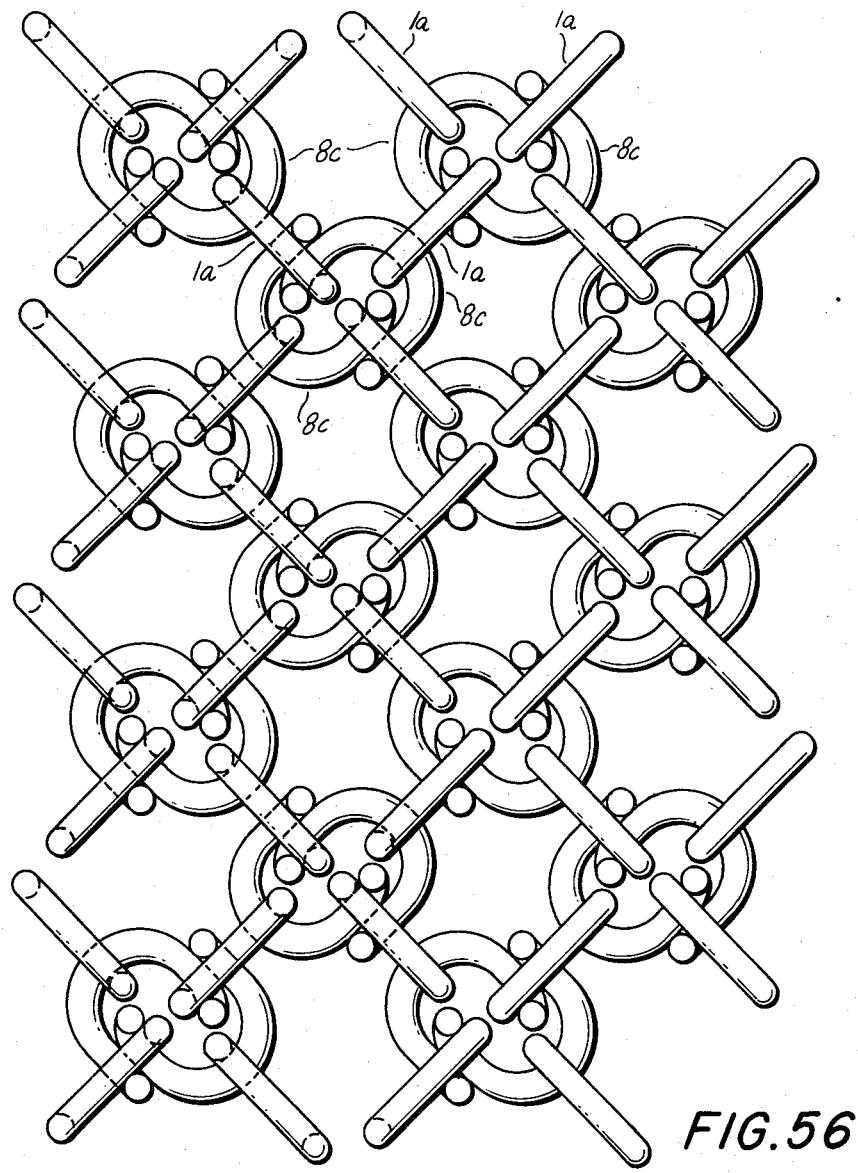
FIG. 56 shows a fragmentary plan view of a mesh assembled from elements according to FIGS. 50–53.

FIG. 56, finally, shown how the elements constructed according to FIGS. 50–55 are connected to form a mail mesh. The side strips have been omitted for simplicity of illustration, but can be of the same type as illustrated in FIGS. 43–46, or of another type which may be desired.

If a mail mesh is constructed of elements which are composed of four sections of which two are always identical, it is particularly adaptable to the contour of a tire and also to uneven ground surfaces. It is therefore particularly advantageous for relatively small tires or for those which undergo relatively substantial deformation during operation. It is advantageous that the connection between these individual sections be such that they can be separated— and of course connected— only when they are displaced with reference to one another by substantially 90° out of their normal connected operating position. This precludes to all intents and purposes undesired separation of the individual sections and therefore of the connected elements, because once the mail mesh is applied to a vehicle tire, it is impossible for the sections to assume with reference to one another a position in which they can inadvertently become disconnected. On the other hand, they can be readily separated manually and without the aid of any tools when it is necessary or desired to replace individual ones of the sections or whole elements because of damage.

If projections 11 and 12 are provided on one or both of the arms 9 of the respective U-shaped sections, and if the distance between the projections 11 and 12 corresponds to between 1.5 – 2.5 times the thickness of the associated annular section measured in direction normal to the plane of its opening, a mesh assembled from such elements can particularly readily accommodate itself to the curvature of the vehicle tire and to unevennesses of the ground, because the assembled sections of each element have relatively liberal freedom of movement with reference to one another.

If one of the arms of the U-shaped section of an element is offset inwardly in direction towards the other arm, as discussed earlier, it is possible to make the associated annular oval section particularly short as seen with reference to its longitudinal axis, so that the entire element assembled is comparatively small without in any way influencing the freedom of movement of the individual sections with reference to associated elements with which they are connected. Instead, the smaller dimensioning of elements so produced results in better accommodation of the mail mesh assembled from such elements, to the vehicle tire as well as to the ground over which the tire and the mesh move. If the one arm is offset by a distance which corresponds to substantially the thickness of the other non-offset arm, the pivot points D of adjacent elements in the opening of the two U-shaped sections are located in a common plane despite the fact that the two U-shaped sections are coupled in substantially bayonet-type manner with an oval annular section with the resulting arrangement of the end portions of the arms of the two U-shaped sections adjacent one another in the opening of the annular section. This avoids the possibility that the oval annular sections of connected and adjacent elements could be located parallel with one another, and instead they can be located during assembly only in a line behind one another.

By observing the aforedescribed relationship of the dimensions $t_1$, $t_2$ and the distance between the pivot points D, a protective mail mesh can be assembled from so constructed elements which is possessed of a significant shear effect, which is in turn especially advantageous for a reliable and proper mounting of the mesh on the tire. With such a construction the mesh can reliably conform itself to all curvatures of the associated tire and can be tightly mounted on the same.

Different types of steel are especially suitable for making the sections and elements of a mail mesh according to the present invention. Thus, a specially treated steel, an alloy or non-alloyed tool steel or an austenitic manganese hard steel may be used, as well as others. Particularly advantageous are such steels which can be made wear-resistant by annealing. Of course, other types of steel are also suitable, although the aforementioned ones are especially advantageous. In fact, it is possible to use different materials for the different sections of a given element, with the selection of the different materials being based upon a consideration of the stresses to which any specific section of each element is subjected in use. Thus it is possible to produce a mail mesh having particularly good characteristics with respect to strength and resistance to wear.

As evident from the previous description and from the drawing, some or all of the strips of any given mail mesh according to the present invention consist exclusively or predominantly of identical elements, so that such a mesh can be constructed by using only very few different components which makes the mesh particularly simple and inexpensive. However, one or all of the strips constituting a mail mesh according to the present invention may also be composed in part or predominantly of elements according to two or more different embodiments as heretofore discussed. The selection will be made primarily in view of considerations relating to different requirements, especially with respect to the tread strip as compared to the side strips. It is clear that the large variety of possible combinations makes it possible to produce a mail mesh having optimum characteristics with respect to the operating conditions to which it is to be subjected, wear requirements, ground surface requirements, tire configurations and dimensions, and the like.

It is generally advantageous that the annular sections which serve as supports for the tire and contact the ground and the tire, respectively, all extend at an acute angle with reference to the direction of advancement of the tire. Such an arrangement provides for both a good lateral guidance of the tire provided with a mesh according to the invention, as well as for highly advantageous traction. However, it is also possible to have the various annular sections—as well as any known chain link connecting sections which may be used according to the description carried out herebefore—extend either in the direction of advancement of the tire or transversely thereto. Depending upon the particular embodiment of a mail mesh utilizing such arrangements, either the lateral guidance of the tire or the traction thereof is improved by such an arrangement.

It will be understood that each of the elements described above, or two or more together, may also find a useful application in other types of arrangements differing from the types described above.

While the invention has been illustrated and described as embodied in a protective mail mesh for vehicle tires and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. A protective mail mesh adapted to externally surround vehicle tires, comprising a mesh tread strip for surrounding the entire tread face of a vehicle tire and two mesh side strips for respectively overlying the side faces of such vehicle tire, said mesh strips being composed of a plurality of elements each of which comprises a plurality of discrete sections so configurated as to admit of releasable connection solely as a function of their respective configuration without welding or deformation, at least one of said sections having at least one aperture and at least one other section having a first portion received in said aperture and two additional portions flanking said first portion, said elements being releasably connected with one another and each of said sections being secured against undesired disengagement from the respective mesh strip by a least one adjacent section, at least the elements of said mesh tread strip providing a continuous linkage of articulately connected elements extending all the way around the circumference of the tread face.

2. A protective mail mesh as defined in claim 1, wherein said one section of at least one of said elements is located in a first plane and the other section of said one element is located in a second plane which is at least substantially normal to said first plane.

3. A protective mail mesh as defined in claim 1, wherein said other section of at least one of said elements is an at least substantially U-shaped section.

4. A protective mail mesh as defined in claim 1, wherein said one and said other section of at least one of said elements are configurated for bayonet lock type engagement with each other and for admitting of separation from each other only in a predetermined position relative to each other.

5. A protective mail mesh as defined in claim 1, wherein said one section of at least one of said elements is a circumferentially complete annulus of substantially oval outline and said other section of said one element is of substantially U-shaped outline.

6. A protective mail mesh as defined in claim 5, wherein said one element comprises a plurality of sections of substantially U-shaped outline.

7. A protective mail mesh as defined in claim 1, wherein said one section of at least one of said elements consists of a first material and said other section of said one element consists of a different second material.

8. A protective mail mesh as defined in claim 1, wherein at least one of said strips consists at least substantially exclusively of said elements.

9. A protective mail mesh as defined in claim 1, wherein at least the majority of said elements are identical with one another.

10. A protective mail mesh as defined in claim 1, wherein said mesh tread strip is composed at least predominantly of elements which are different from the elements of which said side strips are composed.

11. A protective mail mesh as defined in claim 1, wherein said one section of at least one of said elements has two apertures and said other section of said one element has a bight and two arms projecting from said bight one of said arms constituting said first portion and said additional portions.

12. A protective mail mesh as defined in claim 11, wherein each of said apertures has an enlarged portion and said one arm has a free end provided with a least one projection receivable in the enlarged portion of one of said apertures and permitting a sliding movement of said free end through said one aperture only when said sections of said one element have a predetermined orientation with respect to each other.

13. A protective mail mesh as defined in claim 12, wherein the enlarged portion of the other of said apertures is at least substantially filled by the projection of the other section of an element which is adjacent to said one element.

14. A protective mail mesh as defined in claim 1, wherein said aperture of said one section of at least one of said elements has at least two aperture portions and elongated portions each communicating with one of said aperture portions, said other section of said one element having a bight and two arms projecting from said bight, one of said arms constituting said first portion and said additional portions and having a free end received in one of said aperture portions and a projection received in the respective elongated portion.

* * * * *